United States Patent
Layman et al.

(10) Patent No.: US 9,516,067 B2
(45) Date of Patent: *Dec. 6, 2016

(54) METHOD AND SYSTEMS FOR AN OUTGOING UNIDIRECTIONAL OUTAGE BYPASS FOR A VOICE OVER INTERNET PROTOCOL PRIVATE BRANCH EXCHANGE SYSTEM

(71) Applicant: Vocalocity, Inc., Atlanta, GA (US)

(72) Inventors: Randy Layman, Marietta, GA (US); Robert Michael Smith, Atlanta, GA (US); Keith Meyers, Powder Springs, GA (US); Barry Fleming, Roswell, GA (US)

(73) Assignee: VONAGE BUSINESS INC., Atlanta, GA (US)

( * ) Notice: Subject to any disclaimer, the term of this patent is extended or adjusted under 35 U.S.C. 154(b) by 431 days.

This patent is subject to a terminal disclaimer.

(21) Appl. No.: 13/831,785

(22) Filed: Mar. 15, 2013

(65) Prior Publication Data

US 2014/0140200 A1     May 22, 2014

Related U.S. Application Data

(63) Continuation-in-part of application No. 13/680,067, filed on Nov. 18, 2012.

(51) Int. Cl.
   *H04L 29/06*     (2006.01)
   *H04L 12/24*     (2006.01)
   *H04L 12/26*     (2006.01)

(52) U.S. Cl.
   CPC ....... *H04L 65/1053* (2013.01); *H04L 41/0659* (2013.01); *H04L 41/0663* (2013.01);
(Continued)

(58) Field of Classification Search
CPC ............ H04L 41/0663; H04L 41/0659; H04L 41/5009; H04L 41/5087; H04L 43/08; H04L 65/1053; H04L 65/1043; H04L 12/66; H04L 29/06292; H04L 41/0246; H04L 41/06; H04L 41/0654; H04L 45/28; H04L 61/1529; H04L 65/1006; H04L 65/1069; H04L 69/40; H04L 11/00; H04L 11/04; H04M 3/42314; H04M 3/08; H04M 7/006; H04M 7/0084; H04M 7/009; H04M 7/1285; H04M 7/0057; H04M 15/56; H04M 2203/404; H04M 2207/203; H04M 2215/202; H04M 2215/7414; H04M 3/5158; H04M 3/5232; H04M 3/42323; H04M 7/0024; H04M 7/1205; H04M 2203/306; H04M 2203/408; H04M 2242/30; H04W 84/16
See application file for complete search history.

(56) References Cited

U.S. PATENT DOCUMENTS 6,363,065 B1 * 3/2002 Thornton ................ H04L 12/14
                                                                 370/352
6,570,855 B1 * 5/2003 Kung ...................... H04L 65/80
                                                                 370/237

(Continued)

OTHER PUBLICATIONS

International Search Report mailed Jul. 14, 2014 for Application PCT/US2014/026095.

(Continued)

*Primary Examiner* — Michael Thier
*Assistant Examiner* — Eric Nowlin
(74) *Attorney, Agent, or Firm* — Alexander Legal LLC; Joseph Pagnotta (57) ABSTRACT

A system and method is disclosed herein for providing a unidirectional outage bypass for outgoing communications
(Continued)

from a session initiation protocol (SIP) device in a hosted Voice-over Internet Protocol (VoIP) private branch exchange (PBX) system. An outage monitoring system is in communication with both a bypass configuration system and one or more bypass enablers that act at the direction of the bypass configuration system. The outage monitoring system detects outages and overloads, as well as, network failures between network components, the VoIP PBX, Client Devices and the public switched telephone network (PSTN). The bypass configuration system, in response to a detection of an outage, determines error-handling procedures for the unidirectional outage bypass system based on bypass configuration data. The bypass enablers forward outgoing communications between a client device and the PSTN, in accordance the error-handling procedures, by bypassing components that are currently experiencing failures or overloads.

29 Claims, 4 Drawing Sheets

(52) U.S. Cl.
CPC ...... *H04L 41/5009* (2013.01); *H04L 41/5087* (2013.01); *H04L 43/08* (2013.01)

(56) References Cited

U.S. PATENT DOCUMENTS

| | | | |
|---|---|---|---|
| 7,508,754 B1 | 3/2009 | Sankaranaraynan et al. | |
| 7,639,793 B1* | 12/2009 | Croak et al. | 379/221.01 |
| 7,865,556 B2 | 1/2011 | Kadashevich | |
| 8,576,700 B2 | 11/2013 | Boudreaux et al. | |
| 9,025,438 B1* | 5/2015 | Palmer | H04L 45/28 370/217 |
| 9,264,299 B1* | 2/2016 | Palmer | H04L 41/0654 |
| 2001/0028649 A1* | 10/2001 | Pogossiants | H04L 29/06 370/389 |
| 2005/0180396 A1* | 8/2005 | Lim | 370/352 |
| 2006/0002290 A1 | 1/2006 | Chen | |
| 2006/0072726 A1 | 4/2006 | Klein et al. | |
| 2007/0070976 A1* | 3/2007 | Mussman | H04L 12/6418 370/351 |
| 2008/0130856 A1 | 6/2008 | Ku et al. | |
| 2008/0317011 A1* | 12/2008 | Datta | H04L 12/4633 370/356 |
| 2009/0323534 A1* | 12/2009 | Taylor | H04L 12/2854 370/237 |
| 2010/0162034 A1* | 6/2010 | Degenhardt | H04L 65/1053 714/4.11 |
| 2010/0216476 A1 | 8/2010 | Gupta et al. | |
| 2010/0220585 A1* | 9/2010 | Poulson | H04L 45/22 370/216 |
| 2010/0223494 A1* | 9/2010 | Degenhardt | H04L 65/1053 714/4.1 |
| 2011/0206037 A1* | 8/2011 | Zhakov | H04M 3/42017 370/352 |
| 2011/0230196 A1 | 9/2011 | Tal et al. | |
| 2011/0320140 A1 | 12/2011 | Butler et al. | |
| 2012/0167208 A1 | 6/2012 | Buford | |

OTHER PUBLICATIONS

Written Opinion Report mailed Jul. 14, 2014 for Application PCT/US2014/026095.

* cited by examiner

METHOD AND SYSTEMS FOR AN OUTGOING UNIDIRECTIONAL OUTAGE BYPASS FOR A VOICE OVER INTERNET PROTOCOL PRIVATE BRANCH EXCHANGE SYSTEM

CROSS-REFERENCE TO RELATED APPLICATIONS

This invention is a Continuation-In-Part of application Ser. No. 13/680,067, Filed Nov. 18, 2012, entitled "Methods and Systems For Bidirectional Outage Bypass For A Voice Over Internet Protocol Private Branch Exchange," the entirety of which is incorporated herein by reference.

FIELD OF THE INVENTION

The present invention relates generally to Voice-over-Internet-Protocol (VoIP) and Session Initiation Protocol (SIP) electronic communications and, more particularly, to methods and systems for providing unidirectional bypass outage protection for outgoing communications for both VoIP Private Branch Exchange (PBX) failures and Internet service failures.

BACKGROUND OF THE INVENTION

A Private Branch Exchange (PBX) is a telephone exchange that makes connections among the internal telephones of an organization, such as a private business or telephone network. The PBX allows these internal telephones to connect to the public switched telephone network (PSTN) via trunk lines and/or the Internet. A hosted PBX system delivers PBX functionality as a service, available over the PSTN and/or the Internet. A telephone company typically provides hosted PBXs using equipment located on the premises of the telephone company's exchange. This means the customer organization does not need to buy or install PBX equipment and this gives the customer organization more flexibility because the telephone company can use the same switching equipment to service multiple PBX hosting accounts. Furthermore, VoIP gateways can be combined with traditional PBX functionality enabling businesses and organizations to use their managed Internet/Intranet to help reduce long distance expenses and to enjoy the benefits of a single network for voice and data which gives greater cost savings, mobility and increased redundancy.

For users that rely on a VoIP PBX system for their organization's primary communications system, reliability of the system to complete phone calls is a major concern; of particular concern is what will happen if the system becomes overloaded or the system goes down. This concern may be further exacerbated if the organization relies on a hosted VoIP PBX where the service is accessed over the Internet and shared with many other organizations, and therefore the service may be subject to greater possibility of overload or interruption due to Internet service outages.

The requirements of a hosted VoIP PBX have created the need for a new kind of outage bypass solution. Pre-existing systems fail to protect users against failure and overload of the VoIP PBX and/or the Internet service used to connect the VoIP PBX to the users' calling devices. Without such an outage bypass solution, if the VoIP PBX has a failure or if there are network or other problems with the connection to a user's session initiation protocol (SIP) device (telephone terminal), then users are no longer able to make or receives calls, and callers receive no notification about what sort of problem exists. Pre-existing systems may have provided some level of unidirectional bypass or override, but heretofore no system has existed that provides outgoing unidirectional bypass with outage protection for both VoIP PBX overload or failure and also Internet service failure or interruption combined with a configurable problem notification capability.

The present invention meets one or more of the above-referenced needs as described herein in greater detail.

SUMMARY OF THE INVENTION

The present invention relates generally to VoIP and SIP electronic communications and, more particularly, to methods and systems for providing an outgoing unidirectional outage bypass for a VoIP PBX system. Briefly described, aspects of the present embodiments include the following.

In a first aspect, the present embodiment provides a method for an outgoing unidirectional outage bypass system for a hosted VoIP PBX system. The system comprises a client device or a group of client devices in communication with an outage monitoring system. The outage monitoring system is in communication with a bypass configuration system and one or more bypass enablers. The bypass enablers act at the direction of the bypass configuration system. The outage monitoring system is configured to detect both outages and overload conditions in the network components, the VoIP PBX, as well as, network failures between the VoIP PBX and the PSTN in communication with the VoIP PBX. The bypass configuration system, in response to an outage detection, directs the bypass enablers to route outgoing communications between the SIP (client) devices and the PSTN while bypassing the network components and/or VoIP PBX components that are currently experiencing failures or overloads. Next the bypass configuration system directs the routing of the outgoing communications via the bypass enablers based on a set of bypass configuration data.

In a further aspect, a predetermined set of rules for responding to outages and overload conditions in the VoIP PBX system is included in the bypass configuration data. The bypass configuration system also uses call routing metadata to allow an edge server to route the outgoing communications from the client devices based on the predetermined set of rules. The bypass configuration system configures the network components based on the predetermined set of rules for routing outgoing communications from the client devices to the PSTN. Furthermore, the unidirectional outage bypass system is configured based on the predetermined set of rules for limiting the types of outgoing communications allowed by the system. The predetermined set of rules can be used to limit the types of outgoing communications to internal, emergency, local, or other non-toll calls.

In a further aspect, the unidirectional outage bypass system references a predetermined set of rules, which can direct it to play a configurable audio message to a user initiating a call in response to outgoing communications. In still another aspect, the predetermined set of rules allows the bypass enablers to route communications directly between the client devices and bypassing the VoIP PBX.

In another aspect, a method for providing a unidirectional outage bypass for a VoIP PBX system is disclosed. An outage monitoring system in communication with a bypass configuration system and in communication with one or more bypass enablers are provided that act at the direction of the bypass configuration system. The outage monitoring system is configured to detect outages and overload conditions in the network components, the VoIP PBX, as well as, network failures between the VoIP PBX and the PSTN and/or network failures between the VoIP PBX and a client device or a group of client devices. The bypass enablers are then directed to route outgoing communications between the client devices and the PSTN while bypassing the network components and/or VoIP PBX components that are currently experiencing failures or overloads using the bypass configuration system, in response to the outage detection. The bypass configuration system directs the bypass enablers to route the outgoing communications based on a set of bypass configuration data.

A final aspect includes an embodiment of a system of providing a unidirectional outage bypass for a hosted VoIP PBX system comprising an outage monitoring system configured to detect outages and overload conditions of network components, the VoIP PBX, as well as, network failures between the VoIP PBX and one or more client devices. The outage monitoring system is further configured to detect outages and overload conditions as well as network failures between the VoIP PBX and the PSTN. The bypass configuration system in communication with the outage monitoring system provides error handling in response to the detected outages, overload conditions, network failures; and the bypass configurations system directs one or more bypass enablers to route the outgoing communications based on the set of bypass configuration data.

The above features as well as additional features and aspects of the present invention are disclosed herein and will become apparent from the following description of preferred embodiments of the present invention.

This summary is provided to introduce a selection of aspects and concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Before the present methods and systems are disclosed and described in greater detail hereinafter, it is to be understood that the methods and systems are not limited to specific methods, specific components, or particular implementations. It is also to be understood that the terminology used herein is for the purpose of describing particular aspects and embodiments only and is not intended to be limiting.

As used in the specification and the appended claims, the singular forms "a," "an," and "the" include plural referents unless the context clearly dictates otherwise. Similarly, "optional" or "optionally" means that the subsequently described event or circumstance may or may not occur, and the description includes instances where the event or circumstance occurs and instances where it does not.

Throughout the description and claims of this specification, the word "comprise" and variations of the word, such as "comprising" and "comprises," mean "including but not limited to," and are not intended to exclude, for example, other components, integers or steps. "Exemplary" means "an example of" and is not intended to convey an indication of preferred or ideal embodiment. "Such as" is not used in a restrictive sense, but for explanatory purposes.

Disclosed herein are components that can be used to perform the disclosed methods and systems. It is understood that when combinations, subsets, interactions, groups, etc. of these components are disclosed that although specific reference to each various individual and collective combinations and permutations cannot be explicitly disclosed, each is specifically contemplated and incorporated herein, for all methods and systems. This applies to all aspects of this specification including, but not limited to, steps in disclosed methods. Thus, if there are a variety of additional steps that can be performed it is understood that each of the additional steps can be performed with any specific embodiment or combination of embodiments of the disclosed methods.

As will be appreciated by one skilled in the art, the methods and systems may take the form of an entirely new hardware embodiment, an entirely new software embodiment, or an embodiment combining new software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, non-volatile flash memory, CD-ROMs, optical storage devices, and/or magnetic storage devices. An exemplary computer system is detailed in the discussion of FIG. 4 below.

Embodiments of the methods and systems are described below with reference to flow and block diagrams of methods, systems, apparatuses and computer program products. It will be understood that each block of the flow and block diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flow or block diagram block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flow or block diagram block or blocks.

Accordingly, blocks of the flow and block diagrams support combinations of means for performing the specified functions, combinations of steps for performing the specified functions and program instruction means for performing the specified functions. It will also be understood that each block of the flowchart diagrams and block diagrams, and combinations of blocks in the diagrams, can be implemented by special purpose hardware-based computer systems that perform the specified functions or steps, or combinations of special purpose hardware and computer instructions.

Figure 1:
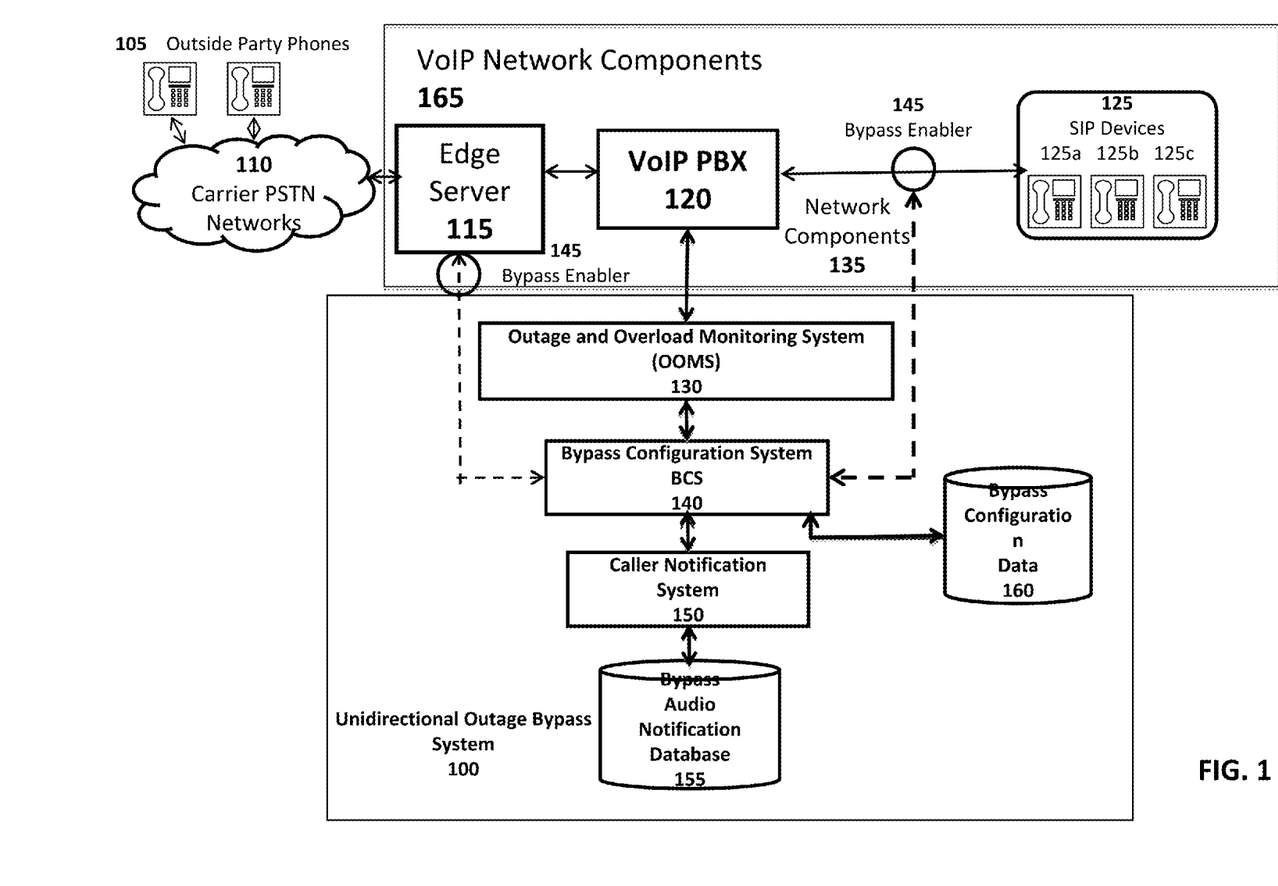
FIG. 1 is a flow diagram of an exemplary embodiment of a unidirectional outage bypass system for hosted VoIP PBX.

FIG. 1 is a flow diagram that illustrates the various aspects of an exemplary embodiment in which the present methods and systems can operate. The present disclosure relates to methods and systems for providing a unidirectional outage bypass system that monitors a VoIP PBX, the SIP devices (which are client devices, such as Internet-based telephone terminals) that register directly and interact with the VoIP PBX, and the network connections between the VoIP PBX and a plurality of SIP devices. Those skilled in the art will appreciate that present methods may be used in systems that employ both digital and analog equipment. One skilled in the art will also appreciate that provided herein is a functional description and that the respective functions can be performed by software, hardware, or a combination of software and hardware.

Turning now to FIG. 1, the unidirectional outage bypass system 100 includes an outage and overload monitoring system (OOMS) 130 that monitors the VoIP PBX 120, the SIP devices 125 that register directly and interact with the VoIP PBX 120, and the network connections 135 between the VoIP PBX 120 and the SIP devices 125. In the case of component outages, failures, or overloads detected by the OOMS 130, for as long as the failures are detected, the unidirectional outage bypass system 100 can take command of outgoing phone calls and provide capabilities to allow calls to be completed or handled while bypassing the failed components; or in the case where they cannot or should not be completed or handled, the unidirectional outage bypass system 100 provides an ability to notify the caller of the failures via one or more configurable audio messages.

In an exemplary embodiment, a user of one of the SIP devices (client devices) 125 is able to initiate a call via the connected network components 135 and the VoIP PBX 120 system to a carrier PSTN 110. In normal operation, the call is routed from the SIP device 125 to the VoIP PBX 120, which is in communication with the PSTN 110 via an edge server 115. The VoIP PBX 120 receives a call request, applies the appropriate calling features available to the SIP device 125 and routes the call via the edge server 115 out to the carrier PSTNs 110 such that the outgoing call routing is completed.

In order to improve quality of service (QOS) of the VoIP PBX system 120, the network can include a unidirectional outage bypass system 100. In an exemplary embodiment, a user of a SIP device 125 initiates a call that is routed via network components 135 to the VoIP PBX 120, which processes the communications requests and either routes the call to another SIP device 125, a,b,c or out to the edge server 115 such that the call can be placed on the carrier PSTNs 110. An OOMS 130 of the unidirectional outage bypass system 100 monitors the VoIP PBX 120 and the network components 135 for outages or overloads that directly affect the ability of the system to complete an outgoing call for users of the SIP devices 125 over the VoIP PBX 120. This includes the VoIP PBX 120 itself which provides call routing and call-handling features such as call transfer, hold, call forwarding, call parking, call recording, call monitoring, and many other potential features for users. This also includes the SIP devices 125, such as SIP desk phones or SIP soft phones, which users rely on for communications via the VoIP PBX 120 out to the PSTN 110. The monitoring further includes the network components 135 between the VoIP PBX 120 and the SIP devices 125. The OOMS 130 monitors all of these components for failures that would affect the ability of the VoIP PBX 120 to route outgoing calls.

The OOMS 130 monitoring can be implemented in a variety of ways. The OOMS 130 can monitor the performance of both software and hardware components with the VoIP infrastructure 100-160. In an exemplary embodiment, the OOMS 130 can monitor hardware components to receive regular heartbeats indicating health from any of VoIP Network Components 165 including the Edge Servers 115, VoIP PBX 120, SIP Devices 125, and/or network components 135. To monitor hardware for example, the OOMS 130 might send non-intrusive requests to the components and monitor the responses, or the OOMS 130 might monitor system logs to detect timeouts and other failures which can also be indicated by a failure to receive regular log updates, or any combination of these techniques or a variety of other techniques commonly used to monitor computer systems and networks. Network timeout errors can also trigger alarms that also alert the OOMS 130 of the need to bypass certain components on the network. In a further embodiment, the OOMS 130 may incorporate hardware component monitoring systems from third party vendors such as those provided by Cisco, Inc., Paessler, Inc. and the like.

The OOMS 130 can also monitor software performance in determining failure and overload conditions among the VoIP Network Components 165. This may include monitoring VoIP call quality by measuring the mean opinion score (MOS) or via other techniques for measuring VoIP audio codecs. Furthermore, the OOMS 130 can monitor the VoIP PBX 120 for specific known overload or failure indicators. For example, in one embodiment the OOMS 130 may monitor the number of concurrent active calls being processed. For example, the OOMS 130 may recognize when the VoIP PBX 120 exceeds a predetermined number of active calls, which might degrade MOS or other call quality metrics. The OOMS 130 may then bypass the VoIP for future outoming calls in order to avoid exceeding the capacity of the VoIP PBX 120. Similarly in an embodiment, the OOMS 130 might monitor components of the VoIP PBX for overload or failure, such as the voicemail processing component, the call recording component, or the conference calling component, and calls may be routed around the VoIP PBX 120 accordingly if it is determined that these failures might impact call quality. The OOMS 130 may proactively monitor parameters essential to VoIP performance, including jitter, packet loss, latency and other calculated performance values. The monitor for MOS can comprise a configurable active monitor for MOS that can trigger an alert if network degradation causes the MOS value to drop below a user configured threshold. The OOMS 130 may further access the MOS for the voice call quality in determining if certain network components or other system components should be bypassed. In an embodiment the OOMS 130 can determine which components in the system 165 are impacting the MOS and perform alternate call routing to avoid these failed components. The MOS may take into account the performance of various codecs in determining the quality of a VoIP call in progress. In an alternative embodiment, the OOMS 130 can be configured to switch to alternative compression codecs to improve VoIP call quality on the network if the current codecs are not optimized to perform under current network or other conditions. As mentioned above, the OOMS 130 can include internal software components and/or other third party software and hardware components for monitoring network performance and health.

When a user attempts to initiate a call using a SIP device 125, the OOMS 130 monitors the VoIP PBX 120 and network components 135 as described above. In an exemplary embodiment, once the OOMS 130 detects a problem, it alerts the bypass configuration system (BCS) 140. The BCS 140 receives notifications from the OOMS 130 indicating the specific problems detected and in some cases, such as network or device outages, the specific users or calls being affected. Upon an indication of an outage or failure, the BCS 140 then monitors the network for outgoing calls that it determines cannot be completed due to the indicated component failure(s).

In an exemplary embodiment, for every outgoing phone call where the BCS 140 has determined bypass action is required due to a fault detection by the OOMS 130 of one or more component failures, the BCS 140 performs a lookup from a connected bypass configuration database 160. The bypass configuration database 160 might be local or remote to the BCS 140, and the storage might be in memory, on disk, or on any other digital storage medium capable of lookup and retrieval of data upon request. The BCS 140 retrieves pre-configured data that provides instructions on how specific outgoing calls should be routed or handled. This data might be associated with specific call locations as indicated by the numbers dialed by the caller initiating a phone call, or the data might be associated with a specific user (or group of users) of the VoIP PBX 120 or a specific SIP device 125 (or group of devices) that is experiencing an outage affecting its ability to place outgoing phone calls. For example, in an embodiment, the bypass configuration data 160 might specify that outgoing calls originating from a SIP device 125 on the network or a specific SIP device 125 associated with the VoIP PBX 120 should be rerouted, in the case of an outage, directly to the edge server 115 such that the call can be handled by the carrier PSTNs 110. In an alternative exemplary embodiment, the outgoing call is routed from the SIP device 125 via a bypass enabler 145 to the BCS 140. The BCS 140 queries the bypass configuration database 160 to determine how the particular outgoing call should be routed or processed. For example, the bypass configuration data 160 might specify an outgoing call originating from the SIP device 125 can only be routed to specific numbers, such as emergency calls to 911 and local or domestic phone calls. The bypass configuration data 160 can also require, in the case of an outage, that calls be routed along a certain network path, such as directly to the edge server 115, where the call can be processed for placement onto the carrier PSTNs 110. Meanwhile, in an alternative embodiment, the bypass configuration data 160 can specify that calls to other specific phone numbers, such as calls to 411 information, toll calls or international calls to specific locations, in the case of an outage, perhaps, should not be rerouted or allowed to be completed at all. In an exemplary embodiment, these options could be configured individually for specific users or groups of users based on needs and requirements.

For each outgoing phone call, according to the bypass actions indicated by the configuration data 160 retrieved, the BCS 140 can attempt to complete the outgoing call while bypassing the VoIP PBX 120 system and network components 135 where failures or outages have been detected by the OOMS 130. In an exemplary embodiment, to reroute an outgoing phone call while bypassing the VoIP PBX 120 and/or a failed network component 135 the BCS 140 interacts with one or more bypass enablers 145 that are directly in the path of network communications to and from the VoIP PBX 120 and therefore are directly in the path of the network packets that comprise outgoing SIP and VoIP communications. The bypass enablers 145 could be one of a variety of network devices, software components, or servers of various types that are capable of intercepting SIP and VoIP communications and performing the necessary interactions to reroute or forward these communications directly to or from SIP devices 125 and directly to the carrier PSTNs 110. For example, the bypass enabler 145 can be network switch/router, or a proxy/load balancer type inline network device, all which can be used to redirect network traffic w/dynamic configuration changes. The bypass enabler 145 can also be a DNS server, in which case the client (in this case the sip device 125) does a DNS lookup to find a destination, and in case of outage rerouting, the BCS 140 would update the DNS server so that it would give the sip device 125 an alternate address to use. In some cases, the BCS 140 may interact with the bypass enabler 145 to forward a phone call to an alternate network path.

In a further exemplary embodiment, if the OOMS 130 indicates an outage, then the BCS 140 retrieves bypass configuration data 160. Using the bypass configuration data 160, the BCS 140 determines that for a specific outgoing phone call it either lacks sufficient information to determine a bypass route or that it specifically is prohibited from performing bypass for the specific call, for example a call from a source like an international caller for which bypass is not supported, then the BCS 140 can take alternative actions.

A further exemplary embodiment can be implemented wherein, in the case of outgoing phone calls where bypass data 160 is missing or bypass is not allowed, then the BCS 140 makes use of an additional component to retrieve one or more caller notification audio messages using a caller notification system 150. The caller notification system 150 can configure the audio messages for specific SIP devices 125 or groups of SIP devices 125 (or specific users or groups of users), specific types of calls, specific outage conditions, specific calling locations, or any combination of these or other attributes that can logically be associated with calls attempted by users of the VoIP PBX 120 system. The caller notification system 150 retrieves one or more audio messages stored in the bypass audio notification database 155 to be played for a SIP device 125 user attempting to place an outgoing call. The BCS 140 interacts with one or more bypass enablers 145 to reroute the outgoing call via a caller notification system 150, wherein the caller notification system 150 may retrieve an appropriate audio message from the bypass audio notification database 155, play the audio message for the user of the SIP device 125 and then disconnect the phone call. These actions can take place while bypassing the VoIP PBX 120.

In these exemplary embodiments, these methods and systems for unidirectional outage bypass for a VoIP PBX 120, involving an OOMS 130 for outage monitoring, a BCS 140 for unidirectional outage bypass, and a caller notification system 150, constitutes a unidirectional outage bypass system 100 that provides a heretofore unavailable level of assurance for VoIP PBX 120 users that outgoing calls can be routed around system failures, with the ability to configure user and group-specific bypass actions, and that in all other cases, callers can be sufficiently notified of the outage. The unidirectional outage bypass system 100 is described in greater detail below.

Figure 2:
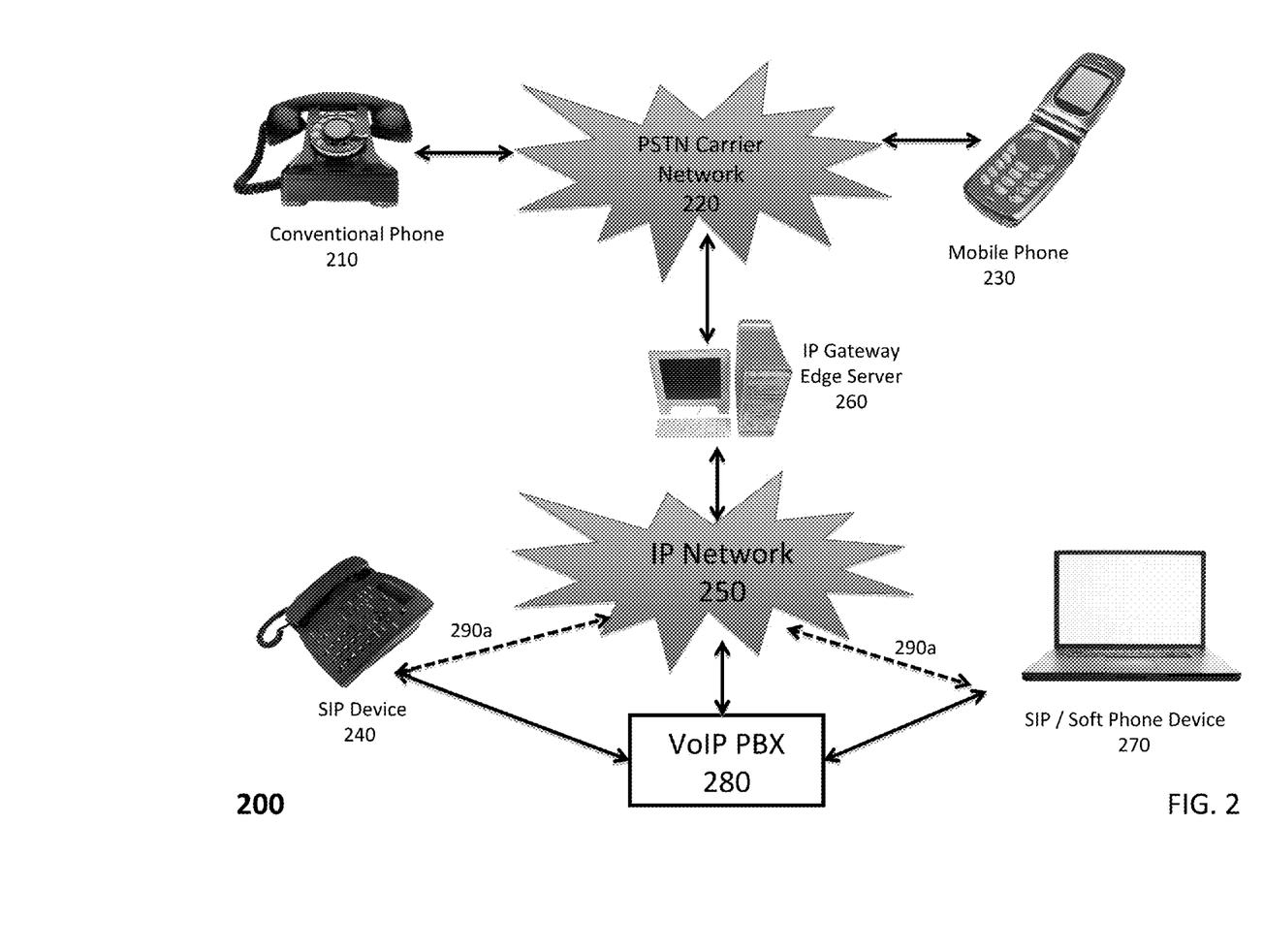
FIG. 2 is a flow diagram of an exemplary embodiment of a hosted VoIP to Edge Server to PSTN system.

Turning next to FIG. 2, an IP Gateway Edge Server to PSTN Carrier Network configuration 200 is illustrated. As shown in FIG. 2, conventional phones 210 and mobile phones 230 communicate over traditional PSTN carrier networks 220. SIP Devices 240 and SIP/Softphone Devices 270 operating on a computing device can communicate with each other over IP networks 250 using text-based Internet VoIP protocols (described below) that are engineered for high data rate links. SIP Devices 240 and SIP/Softphone Devices 270 communicating over the IP Networks 250 can communicate with conventional and mobile phone devices 210, 230 communicating over PSTN carrier networks 220, via an IP Gateway Edge Server 260.

SIP Devices 240 are used to initiate and terminate VOIP calls. SIP Devices 240 are designed to mimic the call setup and signaling characteristics of the PTSN carrier network (traditional telephone network) 220 over an IP network infrastructure 250. A typical SIP Device 240 session involves a client requesting a session with a VoIP PBX 280 in communication with an IP network gateway edge server 260. After the request is received, the IP gateway edge server 260 returns a response to the user SIP device 240, 270 indicating the availability of the session. SIP protocols are ASCII text-based and share some common characteristics with HTTP. Users are identified by a SIP address, which is similar to an email address. The IP gateway edge server 260 is capable to translating the ASCII text-based IP addresses of the SIP devices into traditional phone numbers so the SIP devices 240, 270 can connect with conventional phone systems 210,230.

SIP Devices 240, 270 rely on peer-to-peer architecture that uses intelligent network elements for advanced call processing and call management functions. The SIP Devices 240, 270 represent endpoints that are also referred to as user phones or client device 240, 270. These user phones or client device 240, 270 are managed by the VoIP PBX 280. The VoIP PBX servers 280 can be used as an intermediary responsible for transferring the request from the client SIP Device 240, 270 to the IP gateway edge server 260. VoIP PBX servers 280 can provide advanced call-processing functions including security, authentication, calling features and call routing. Real-time Transport protocol (RTP) is used to carry the voice, data and/or video content at the application layer between SIP Devices 240, 270, the VoIP PBX server 280 and the IP gateway edge server 260.

In an exemplary embodiment, in the event of a VoIP PBX 280 outage or network component failure, the SIP devices 240, 270 can bypass the VoIP PBX server 280 and communicate directly with the IP gateway edge server 260 over the IP network 250 via the network connections 290a as described in the discussion of the flow chart in FIG. 3 below.

Figure 3:
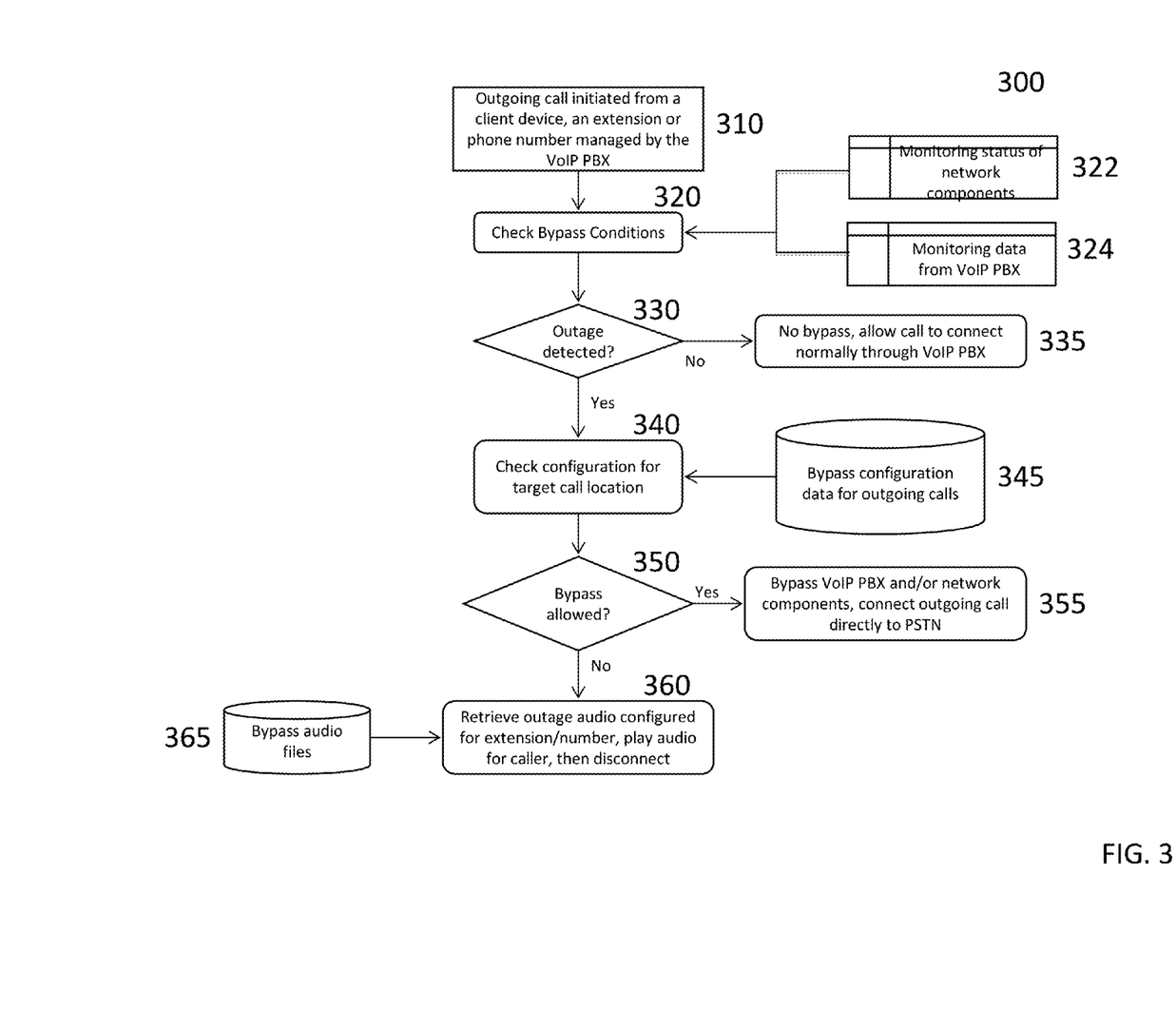
FIG. 3 is a flow chart of an exemplary embodiment of a unidirectional outage bypass system for outgoing communications.

Turning now to FIG. 3 in view of the system of FIG. 1, an exemplary bypass method 300 for outgoing calls is described. Beginning at step 310 an outgoing call is initiated from a SIP Device 125 or extension managed by the VoIP PBX 120. The OOMS 130 at step 320 continuously monitors data from the VoIP PBX 120, the status of the SIP Devices 125, and/or other network components 135 between the SIP Devices 125, the VoIP PBX 120, and the edge server 115 for outages or failures. While a SIP Device 125, at steps 310 and 320, is initiating a call the OOMS 130 checks network components 135, VoIP PBX 120 and/or SIP Devices 125 for outages or failures for the outgoing calls. This continuous checking of bypass conditions at step 320 is necessary to provide outage and failure protection for outgoing calls. Next the method proceeds to step 330.

A decision point is reached at step 330 wherein the method determines if an outage has been detected. In an exemplary embodiment, if there is no outage or failure detected, the outgoing call is allowed to connect normally from the SIP Device 125 to the VoIP PBX 120, the edge server 115 and on to the carrier PSTNs 110, and eventually to an outside party phone 105. However, in a further exemplary embodiment, if an outage or failure is detected for the VoIP PBX 120, SIP Device 125, and/or network components 135 between the SIP Device 125, the VoIP PBX 120, and the edge server 115, the method determines that a bypass around the problem is necessary and therefore, it proceeds to step 340.

At step 340, the BCS 140 is activated. In an exemplary embodiment, at step 340 the bypass enabler 145 redirects the outgoing call to the BCS 140, wherein the BCS 140 references the bypass configuration database 160 at step 345. At steps 340 and 345, when the BCS 140 references the bypass configuration database 160 it determines the particular error handling procedures for the particular extension or SIP Device 125 from which the outgoing call is originating. Alternatively, the error-handling procedures may be generally directed to all extensions and/or SIP Devices 125 on the VoIP PBX 120 network. After the method checks for the error-handling procedures at step 340, the method continues to step 350.

In an exemplary embodiment, at step 350, a series of error-handling procedures can be found which the BCS 140 uses to route the outgoing call. For example, if the bypass is allowed at step 350, error-handling procedures can reroute the outgoing call at step 355 by bypassing the failed components and redirecting the outgoing phone call directly to edge server 115 and on to the carrier PSTN 110. However, if the outgoing call cannot be passed directly to the carrier PSTN 110 or error-handling configuration so indicates, then the method will proceed instead to step 360.

In an exemplary embodiment, at step 360, the error-handling procedure directs the system to retrieve outage audio configuration data for a particular SIP Device 125 and/or VoIP PBX system 120. The audio message can be retrieved from a bypass audio file at step 365. In an exemplary embodiment, an audio message may be used to alert the caller that the network is down or otherwise unavailable. At step 360, the audio message is played to the caller and the BCS 140 will disconnect the call.

Figure 4:
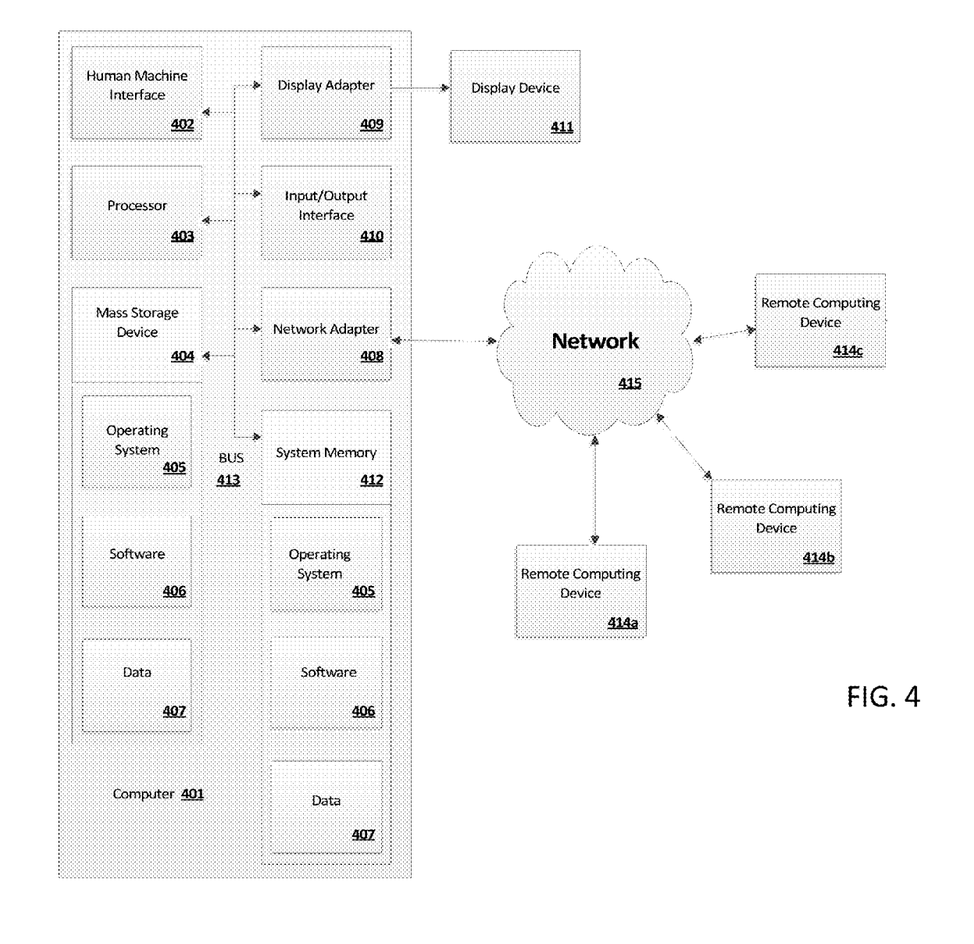
FIG. 4 is a block diagram of an exemplary computing environment that may be used in conjunction with example embodiments and aspects.

Turning now to FIG. 4, one skilled in the art will appreciate that the systems and methods disclosed herein can be implemented via a general-purpose computing device in the form a computer 401. The components of the computer 401 can comprise, but are not limited to, one or more processors or processing units 403, a system memory 412, and a system bus 413 that couples various system components including the processor 403 to the system memory 412. In the case of multiple processing units 403, the system can utilize parallel computing.

The system bus 413 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Private Branch Exchange (PBX) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 413, and all buses specified in this description can also be implemented over a wired or wireless network connection and each of the subsystems, including the processor 403, a mass storage device 404, an operating system 405, software 406, data 407, a network adapter 408, system memory 412, an input/output interface 410, a display adapter 409, a display device 411, a human machine interface 402, can be contained within one or more remote computing devices 414 a,b,c at physically separate locations, connected through buses of this form, in effect implementing a fully distributed system.

The computer 401 typically comprises a variety of computer readable media. Exemplary readable media can be any available media that is accessible by the computer 401 and comprises, for example, both volatile and non-volatile media, as well as, removable and non-removable media. The system memory 412 comprises computer readable media in the form of volatile memory, such as random access memory (RAM), and/or non-volatile memory, such as read only memory (ROM). They system memory 412 may contain data such as media, video, audio, or other data 407 and/or program modules such as operating system 405 and software 406 capable of manipulating, translating, transcoding, or otherwise editing the data 407 that are immediately accessible to and/or presently operated on the by the processing unit 403.

In another aspect, the computer 401 can also comprise other removable/non-removable, volatile/non-volatile computer storage media. By way of example, FIG. 4 illustrates a mass storage device 404, which can provide non-volatile storage of computer code, computer readable instructions, data structures, program modules and other data for the computer 401. For example, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, an operating system 405 and hosted VoIP PBX software 406. Both the operating system 404 and hosted VoIP PBX software 406 (or some combination thereof) can comprise elements of the programming and the hosted VoIP PX software 406. Media, video, audio, or other data 407 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems. Examples of hosted VoIP PBX software include Asterisk®, FreeSwitch®, or a Microsoft Lync® server software.

In another aspect, the user can enter commands and information into the computer 401 via client device or an input device (not shown). Example of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 403 via a human machine interface 402 that is coupled to the system bus 413, but can be connected by other interface and bus structures, such as a parallel port, game port, and IEEE 1394 Port (also known as a Firewire port), a serial port, or a universal serial bus (USB).

In yet another aspect, a display device 411 can also be connected to the system bus 413 via an interface, such as a display adapter 409. It is contemplated that the computer 401 can have more than one display adapter 409, and the computer 401 can have more than one display device 411. For example, a display device can be a monitor, an LCD (Liquid Crystal Display), or a projector. In addition to the display device 411, other output peripheral devices can comprise components such as speakers (not shown) and a printer (not shown), which can be connected to the computer 401 via input/output interface 410. Any step and/or result of the methods can be output in any form to an output device. Such output can be any form of visual representation, including but not limited to, textual, graphical, animation, audio, tactile, and the like. The display 411 and computer 401 can be part of one device, or separate devices.

The computer 401 can operate in a networked environment using logical connections to one or more remote computing devices 414a,b,c. By way of example, a remote computing device can be a personal computer, portable computer, smartphone, softphone, client device, a server, a router, a network computer, a peer device or other common network node, and so on. Logical connections between the computer 401 and remote computing device 414 a,b,c can be made via a network 415, such as a local area network (LAN) and or a general wide area network (WAN). Such network connections can be through a network adapter 408. A network adapter 408 can be implemented in both wired and wireless environments. Such networking environments are conventional and commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of media manipulation software 406 can be stored on or transmitted across some form of computer readable media. Any of the disclosed methods can be executed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to RAM, ROM, EEPROM, flash memory or memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent system (e.g. expert interference rules generated through a neural network or production rules from statistical learning).

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, mobile phones, softphones, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for providing a unidirectional outage bypass for a hosted voice-over Internet protocol (VoIP) private branch exchange (PBX) comprising:
   a client device or a group of client devices in communication with an outage monitoring system, the hosted VoIP PBX being hosted remote from the client device or the group of client devices, wherein:
   the outage monitoring system in communication with a bypass configuration system and in communication with one or more bypass enablers that act at the direction of the bypass configuration system, the one or more bypass enablers being one or more of software and hardware and being configured to intercept outgoing communications and perform interactions to reroute or forward the outgoing communications from the client device or the group of client devices to a public switched telephone network (PSTN) while bypassing the hosted VoIP PBX, wherein:
   the outage monitoring system is configured to detect outages and overload conditions in the hosted VoIP PBX, as well as, network failures between the hosted VoIP PBX, the client device or group of client devices, and the PSTN;
   the bypass configuration system, in response to at least one of an outage, an overload, and a network failure detection, directs the bypass enablers to route the outgoing communications between the client device or group of client devices and the PSTN while bypassing one or more of the hosted VoIP PBX that is currently experiencing at least one of outage, overload and network failure; and
   the bypass configuration system directs the routing of the outgoing communications via the bypass enablers based on a set of bypass configuration data.

2. The system according to claim 1, wherein a predetermined set of rules for responding to outages and overload conditions in the hosted VoIP PBX is included in the bypass configuration data.

3. The system according to claim 2, wherein the bypass enablers intercept outgoing communications and route the communications by way of the unidirectional outage bypass system based on the predetermined set of rules.

4. The system according to claim 2, wherein the unidirectional outage bypass system is configured to route outgoing communications to the PSTN based on the predetermined set of rules.

5. The system according to claim 2, wherein the unidirectional outage bypass system is configured to limit the types of outgoing communications based on the predetermined set of rules.

6. The system according to claim 5, wherein the predetermined set of rules limits the types of outgoing communications to internal, emergency, local, or other non-toll calls.

7. The system according to claim 2, wherein the bypass configuration system uses a predetermined set of rules for directing the bypass notification system to play a configurable audio message in response an attempted outgoing communication.

8. The system according to claim 2, wherein the bypass configuration system is configured to direct the bypass enablers to route communications directly between the client devices, based on the predetermined set of rules and bypassing the hosted VoIP PBX.

9. A method for providing a unidirectional outage bypass system for a hosted Voice-over Internet Protocol (VoIP) private branch exchange (PBX) comprising:
   providing an outage monitoring system in communication with a bypass configuration system and in communication with one or more bypass enablers that act at the direction of the bypass configuration system;
   configuring the outage monitoring system to detect outages and overload conditions in the hosted VoIP PBX, as well as, network failures between the hosted VoIP PBX, a client device or a group of client devices and a public switched telephone network (PSTN), the hosted VoIP PBX being hosted remote from the client device or the group of client devices;
   directing the one or more bypass enablers to route outgoing communications between the client devices and the PSTN while bypassing one or more of the hosted VoIP PBX that is currently experiencing outages or overload conditions, and the network failures using the unidirectional bypass system, in response to the outage detection; and
   using the bypass enablers to direct the routing of the outgoing communications based on a set of bypass configuration data,
   wherein the one or more bypass enablers comprise one or more of software and hardware and are configured to intercept outgoing communications and perform interactions to reroute or forward the outgoing communications from the client device or group of client devices to the PSTN while bypassing the hosted VoIP PBX.

10. The method according to claim 9, further including a predetermined set of rules in the bypass configuration data for responding to outages and overload conditions in the hosted VoIP PBX.

11. The method according to claim 10, wherein the bypass enablers intercept outgoing communications and route the communications by way of a bypass configuration system based on the predetermined set of rules.

12. The method according to claim 10, further comprising configuring the unidirectional outage bypass system based on the predetermined set of rules for routing outgoing communications to the PSTN.

13. The method according to claim 10, further comprising configuring the unidirectional outage bypass system based on the predetermined set of rules for limiting the types of outgoing communications allowed by the system.

14. The method according to claim 13, further comprising limiting the types of outgoing communications to internal, emergency, local, or other non-toll calls.

15. The method according to claim 10, further comprising configuring the unidirectional outage bypass system based on the predetermined set of rules for directing the bypass notification system to play a configurable audio message in response to outgoing communications.

16. The method according to claim 10, further comprising using the predetermined set of rules to allow the bypass enablers to route communications among a group of client devices directly among themselves while bypassing the hosted VoIP PBX.

17. A system of providing a unidirectional outage bypass for a hosted Voice-over Internet Protocol (VoIP) private branch exchange (PBX) comprising:
an outage monitoring system configured to detect outages and overload conditions of the hosted VoIP PBX, as well as, network failures between the hosted VoIP PBX, one or more client devices, and a public switched telephone network (PSTN), the hosted VoIP PBX being hosted remote from the one or more client devices;
the outage monitoring system further configured to detect outages and overload conditions in the hosted VoIP PBX as well as network failures between the hosted VoIP PBX, the one or more client devices, and the PSTN; and
a bypass configuration system in communication with the outage monitoring system for error handling in response to at least one of a detected outage, a detected overload condition, and a detected network failure, and for directing one or more bypass enablers to route outgoing communications based on a set of bypass configuration data,
wherein the one or more bypass enablers comprise one or more of software and hardware and are configured to intercept outgoing communications and perform interactions to reroute or forward the outgoing communications bypassing the hosted VoIP PBX.

18. The system of claim 17, wherein a predetermined set of rules for responding to outages and overload conditions in the hosted VoIP PBX is included in the bypass configuration data.

19. The system of claim 18, wherein the predetermined set of rules direct the bypass configuration system to play a configurable audio message to callers attempting to make an outgoing communication.

20. The system of claim 17, wherein the bypass configuration system, in response to a network outage, routes a client device's outgoing communication to the PSTN by bypassing the hosted VoIP PBX.

21. The system according to claim 17, wherein outages, overloads, and failures of the hosted VoIP PBX include any interruption in network, hardware, or software services.

22. The system according to claim 21, wherein failures of the hosted VoIP PBX hardware and software services includes an inability to complete outgoing communications through the hosted VoIP PBX.

23. The system according to claim 21, wherein failures of the hosted VoIP PBX hardware and software services include an inability to provide calling features including at least one of call transfer, call hold, call forwarding, call parking, call recording, and call monitoring, through the hosted VoIP PBX.

24. The system according to claim 17, wherein the outage monitoring system is capable of detecting outages, overloads, and failures of the hosted VoIP PBX using hardware and/or software monitoring techniques.

25. The system according to claim 24, wherein the hardware monitoring techniques comprise examining at regular and frequent intervals data sent to and/or retrieved from the hosted VoIP PBX wherein failure conditions are indicated by specific monitoring data indicating overload or outages in any or all of network latency, or network jitter within the at least one of the hosted VoIP PBX and a network including the hosted VoIP PBX that noticeably affects the quality of VoIP performance.

26. The system according to claim 24, wherein software monitoring techniques comprise examining at regular intervals data sent to or retrieved from the hosted VoIP PBX wherein failure identifiers are triggered by time out conditions, network latency, or network jitter among at least one of the hosted VoIP PBX and a network including the hosted VoIP PBX that could noticeably affect the quality of VoIP performance.

27. The system according to claim 24, wherein software monitoring techniques comprise examining at regular intervals system performance measures including the mean opinion score (MOS) for voice call quality to determine if there are performance factors impacting the network.

28. The system according to claim 24, wherein software monitoring techniques comprise examining at regular intervals the MOS and other quality of service (QoS) measures for voice call quality to determine if there are performance factors impacting the network and whether at least one of the hosted VoIP PBX and the network failure should be bypassed.

29. The system according to claim 28, wherein software monitoring techniques include a configurable active monitor for MOS to trigger an alert if network degradation or other system outages or overloads cause the measured performance values to drop below a user configured threshold.

* * * * *